(12) United States Patent
Fujisawa et al.

(10) Patent No.: US 7,289,696 B2
(45) Date of Patent: Oct. 30, 2007

(54) OPTICAL SWITCH DEVICE

(75) Inventors: Eiji Fujisawa, Nagano (JP); Toshifumi Tsuruta, Nagano (JP); Ryuji Kawamoto, Kyoto (JP); Yoichi Nakanishi, Kyoto (JP); Yuichi Suzuki, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/565,339

(22) PCT Filed: Aug. 3, 2004

(86) PCT No.: PCT/JP2004/011087

§ 371 (c)(1),
(2), (4) Date: Jan. 19, 2006

(87) PCT Pub. No.: WO2005/015286

PCT Pub. Date: Feb. 17, 2005

(65) Prior Publication Data

US 2006/0245684 A1 Nov. 2, 2006

(30) Foreign Application Priority Data

Aug. 7, 2003 (JP) ............................. 2003-288575

(51) Int. Cl.
*G02B 6/26* (2006.01)
*G02B 26/00* (2006.01)
(52) U.S. Cl. ........................................ 385/18; 359/290
(58) Field of Classification Search .................... None
See application file for complete search history.

(56) References Cited

U.S. PATENT DOCUMENTS 6,169,826 B1 * 1/2001 Nishiyama et al. ........... 385/22

6,813,412 B2 * 11/2004 Lin .............................. 385/19
2002/0181069 A1 * 12/2002 Brown et al. ............... 359/290

FOREIGN PATENT DOCUMENTS

| JP | 58-007601 | 1/1983 |
|---|---|---|
| JP | 2593477 | 10/1994 |
| JP | 2001-272612 | 10/2001 |
| JP | 2002-250874 | 9/2002 |
| JP | 2004-094188 | 3/2004 |

OTHER PUBLICATIONS

International Search Report dated Sep. 28, 2004 (2 pages).

* cited by examiner

*Primary Examiner*—Tina M. Wong
(74) *Attorney, Agent, or Firm*—Flynn, Thiel, Boutell & Tanis, P.C.

(57) ABSTRACT

An optical switch device (1) of such a type that the COUPLED state of light guides is switched by moving a light reflective member capable of securely preventing a movable body with the light reflective member from being displaced and allowing a reduction in thickness, comprising a pressing member (41) switching the movable body (2) with a prism mirror (10) mounted thereon between a clamped state and an unclamped state, a twisted spring (60) energizing the pressing member in a clamping direction, and a magnetic drive circuit (45) for clamping driving the pressing member (41) in the unclamped state against the torsion spring (60). The magnetic drive circuit (45) for clamping further comprises a clamp coil (72) on the fixed member (13) side and clamp magnets (70, 71) on the pressing member (41) side. The clamp magnets (70, 71) are disposed so as to hold the clamp coil (72) from the inside and outside of the opening thereof with the different poles thereof opposed to each other.

7 Claims, 8 Drawing Sheets

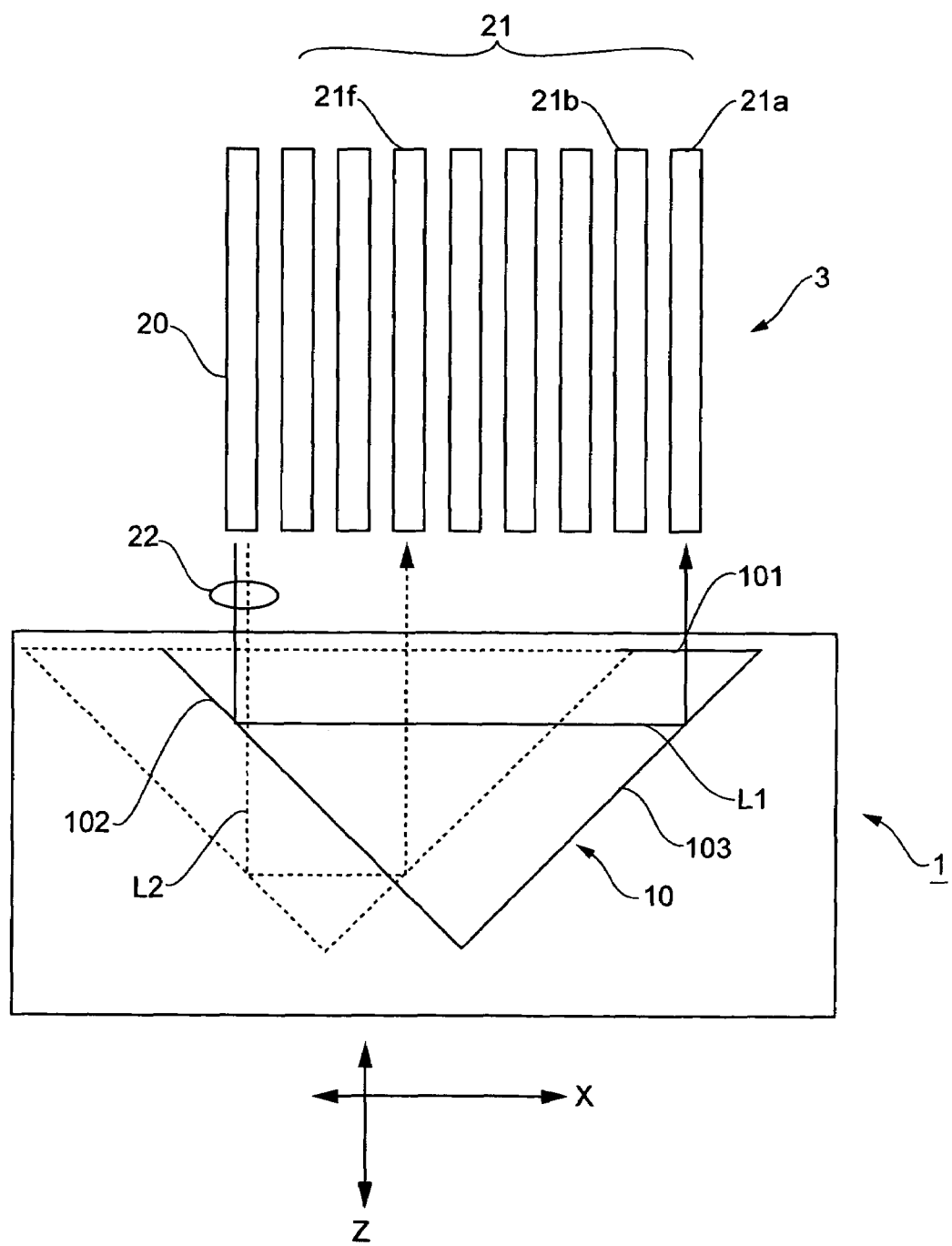
[FIG.1]

[FIG.2]
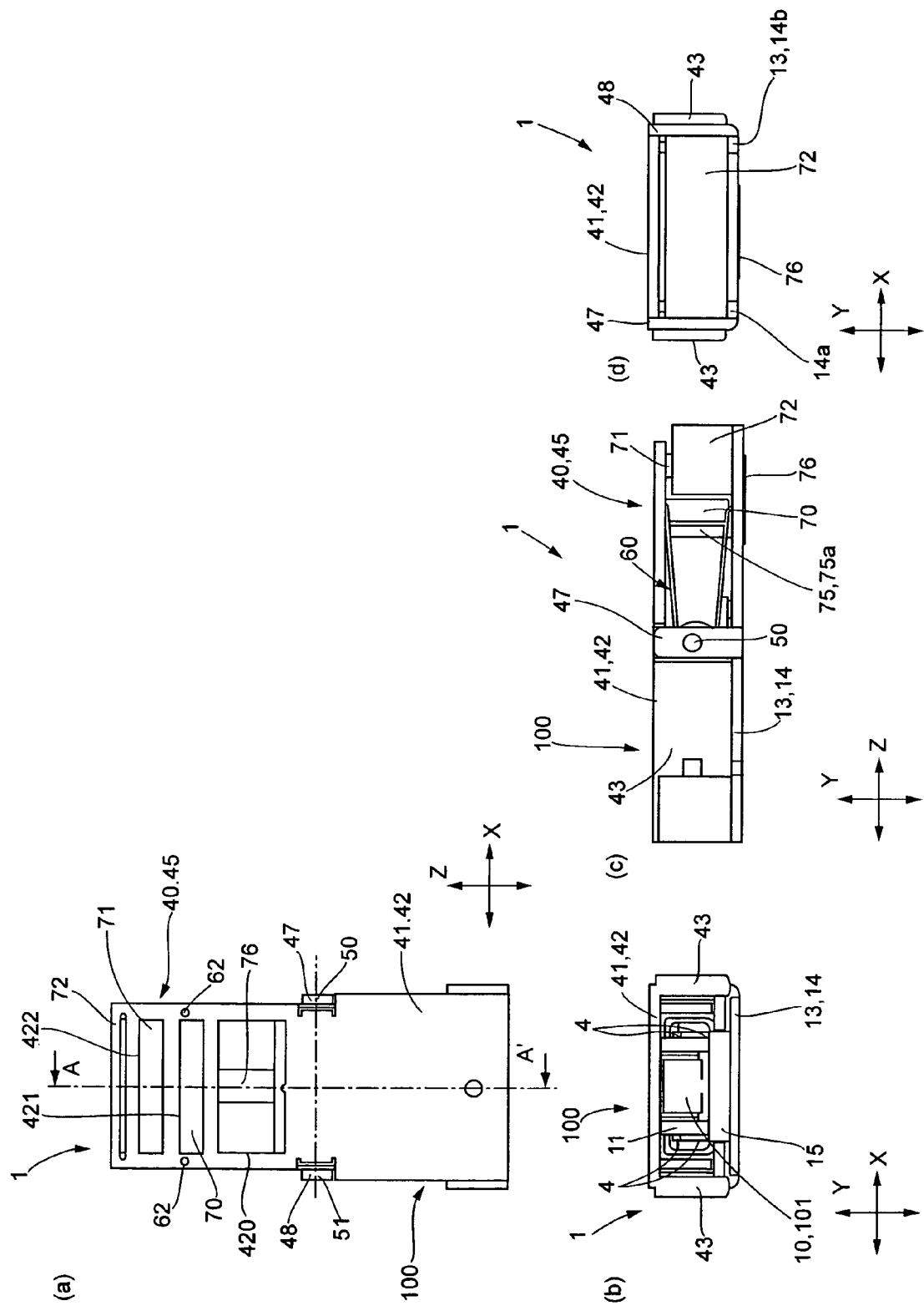

[FIG.3]
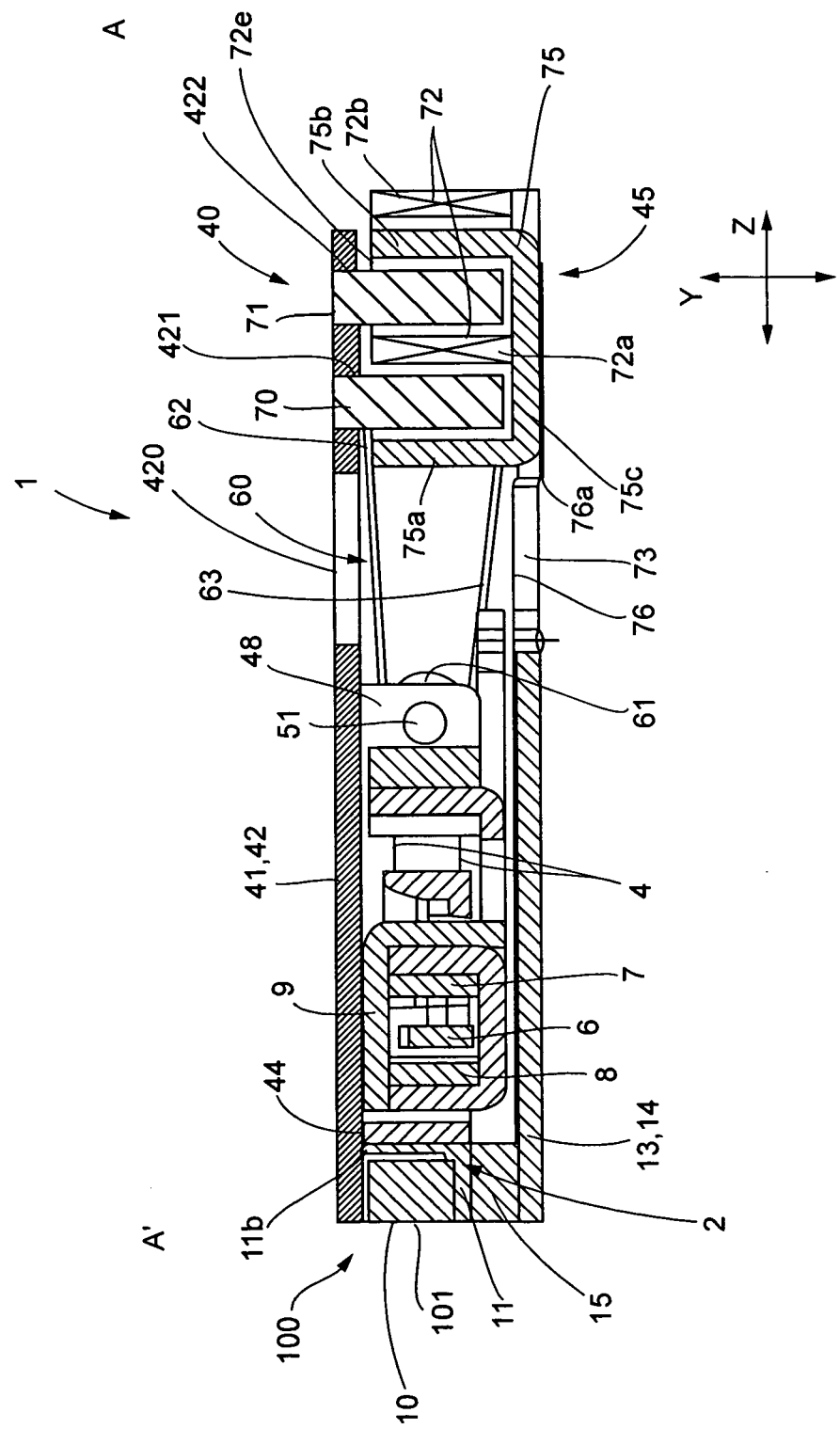

[FIG.4]
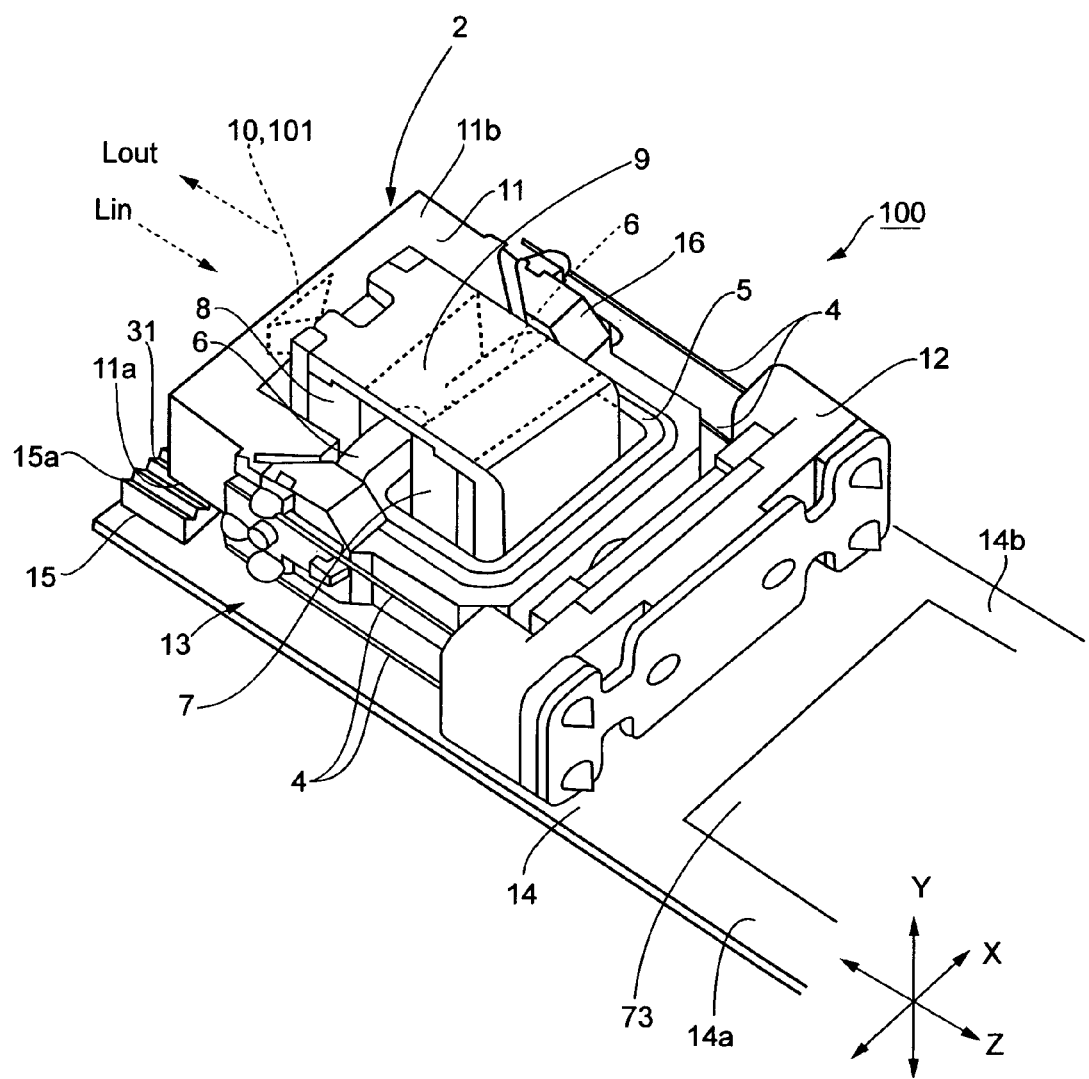

[FIG.5]
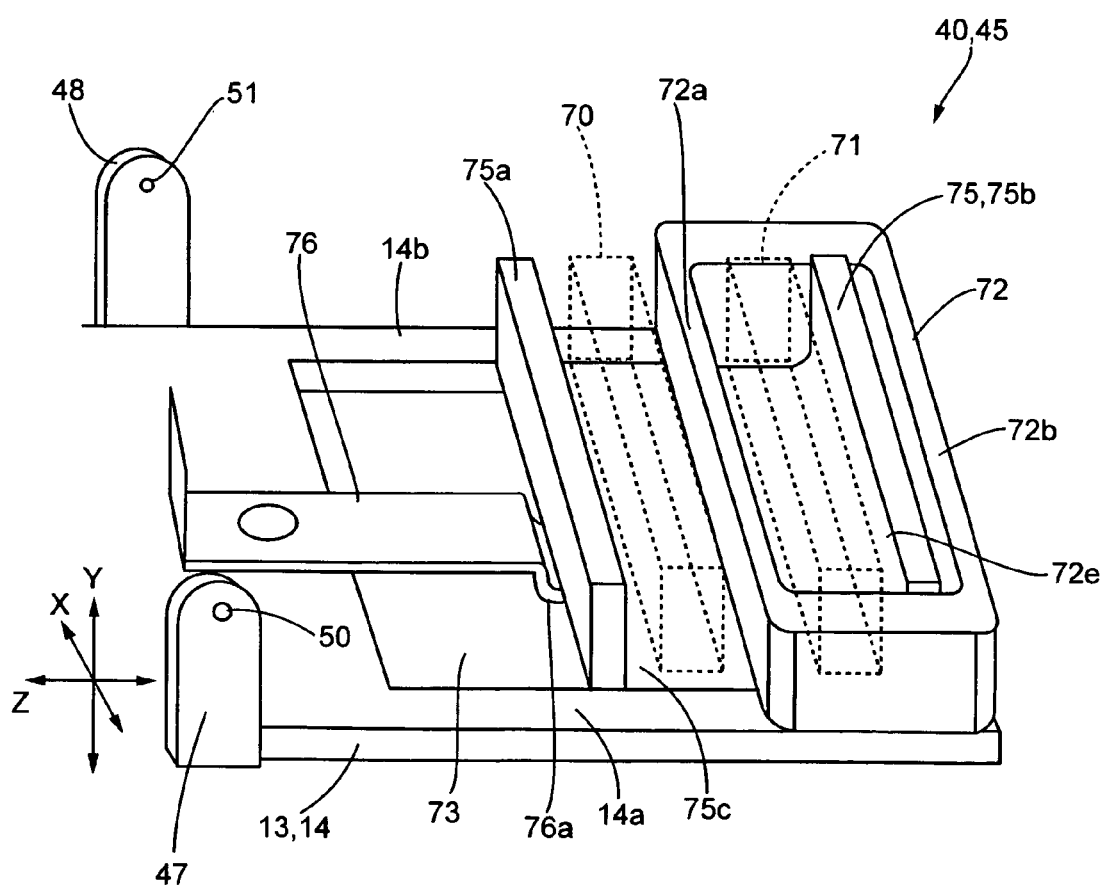

[FIG.6]
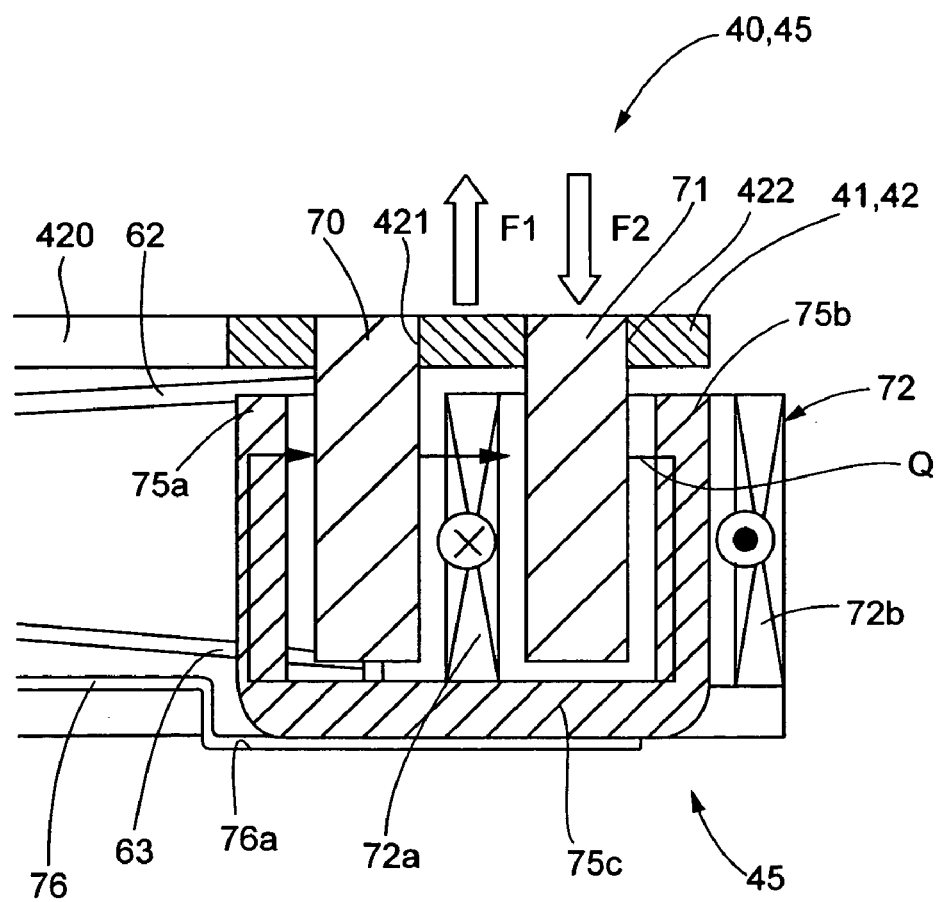

[FIG.7]
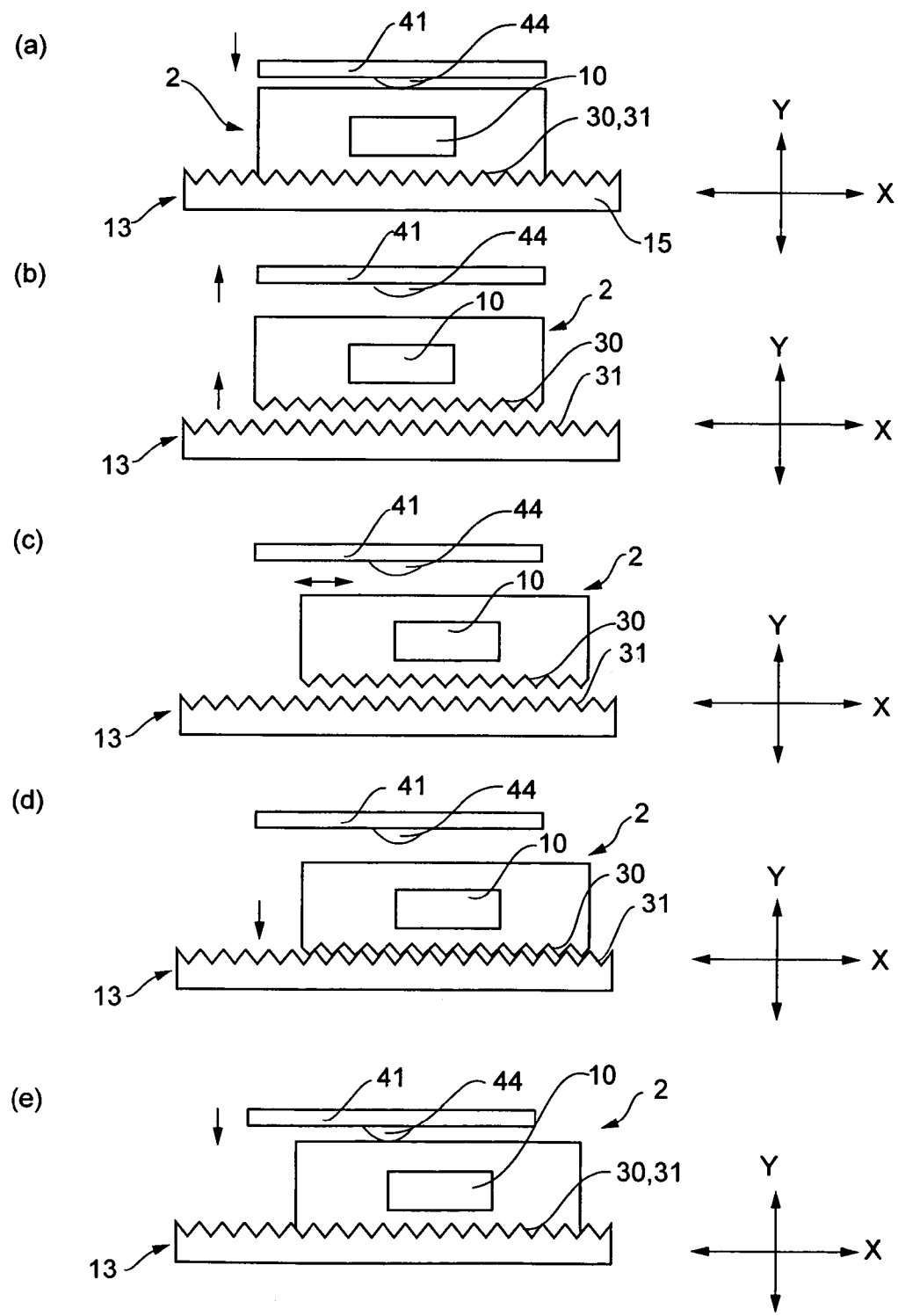

[FIG.8]
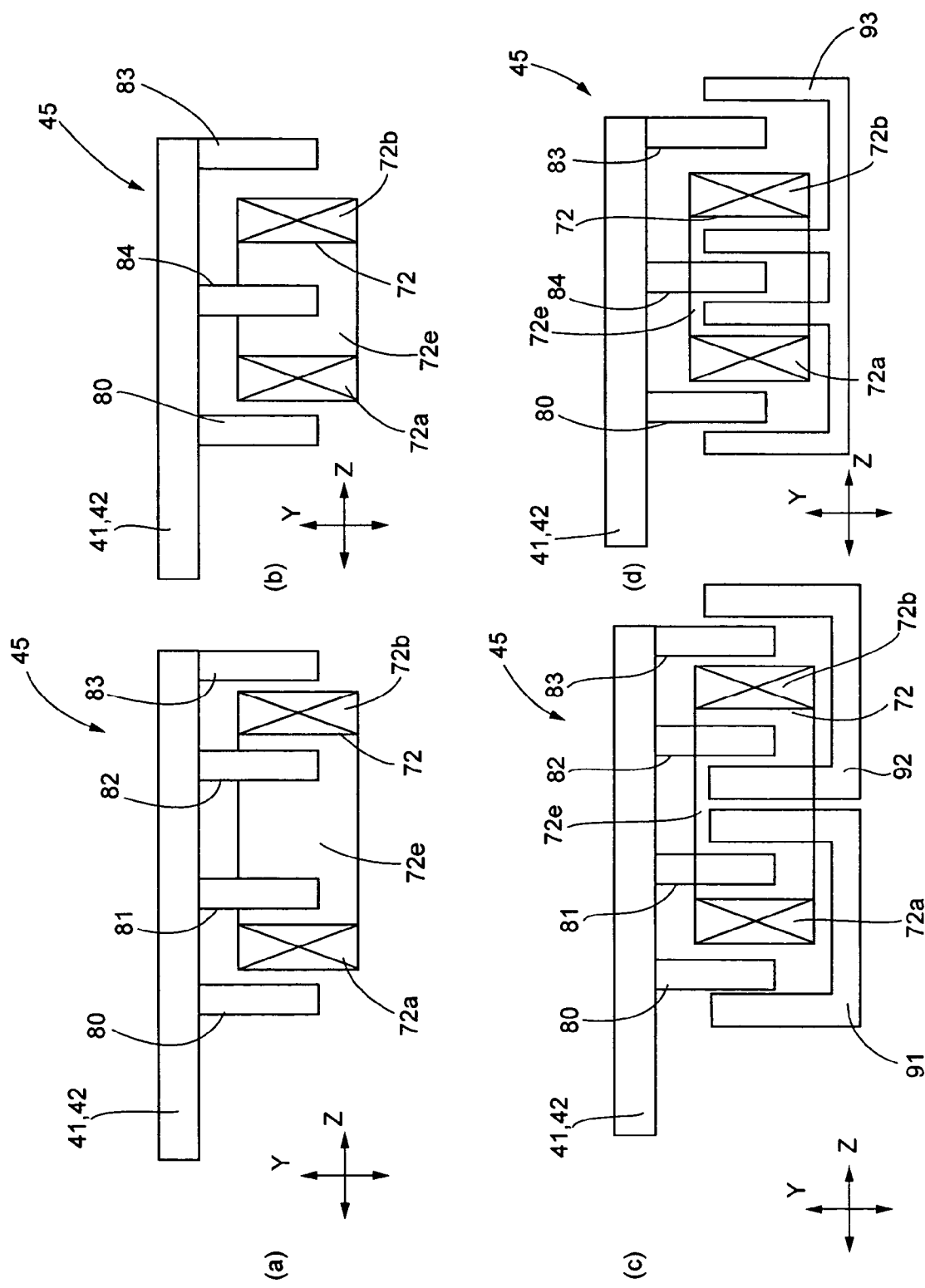

OPTICAL SWITCH DEVICE

TECHNICAL FIELD

The present invention relates to an optical switch device that is used as an optical waveguide switching device for fiber-optic exchangers, or as a variable optical attenuator for suitably attenuating optical input, and more specifically relates to a technique for clamping a movable member mounted with a light-reflecting member that switches the light-emitting position.

BACKGROUND ART

Known as an optical switch device that switches the coupled state of optical fibers and other optical waveguides is MEMS (Micro Electro Mechanical System), which uses a micro actuator and a micro optical element produced by a semiconductor process (JP-A 2002-250874, for example).

Optical waveguide switching devices of the optical waveguide type have a considerable optical loss due to coupling and branching of the optical waveguide fiber. The lifespan of the device is relatively short since power must be constantly fed to the heater in order to maintain the switched condition of the optical waveguide. MEMS-type optical switches suffer from high manufacturing costs because semiconductor processes are used.

In view of the above, there is proposed a device that switches the coupled state between optical-waveguides by causing a rectangular prism mirror to directly face an optical fiber array in which a shared input optical waveguide and a plurality of output optical waveguides are arranged, and moving the rectangular prism mirror in the direction in which the optical fibers are aligned. This type of optical switch device, for example, has a movable member mounted with a rectangular prism mirror, and a fixed-side member for supporting the movable member with wires that can move in the up and down directions and the left and right directions in which the optical fibers are aligned, wherein the optical waveguides are switched by moving the movable member to a desired position by driving the member with a magnetic drive circuit.

However, an optical switching device of the type that moves the rectangular prism mirror to switch the coupled state between optical waveguides has a drawback in that the coupled state between the optical waveguide for input and the desired optical waveguide for output fluctuates with as little as a slight displacement of the rectangular mirror due to vibrations or other effects that are transmitted from the outside, even if the stop position of the rectangular mirror is controlled with high precision, because the optical axis along which light is emitted from the optical switch device continuously moves with the position of the rectangular prism mirror.

In view of the above, there is considered a configuration that prevents positional offset of the movable member by providing a clamp mechanism for pressing and fixing the movable member to the fixed-side member with a spring-loaded pushing member. In this case, the pushing member is formed with a ferrous material, and the movable member is made moveable by disposing a solenoid on the fixed-side member, and attracting the pushing member with the solenoid against the urging force of the spring to lift the pushing member.

DISCLOSURE OF THE INVENTION

Problems to be Solved by the Invention

However, attraction is weak in a clamp configuration that uses a solenoid because the pushing member is attracted only by magnetic flux generated by the solenoid. Therefore, when the urging force of the spring that urges the pushing member toward the fixed-side member is increased, the movable member cannot be released from the pushing member even if the solenoid has been actuated. For this reason, there is a drawback in that the pushing member cannot be pressed and fixed to the fixed-side member with a spring that has a strong urging force, and the positional offset of the movable member cannot be reliably prevented.

In a configuration that uses a solenoid, it is also possible to consider disposing a permanent magnet at the position in which the pushing member faces the solenoid and increasing the magnetic driving force. In such a configuration, however, there is a drawback in that the dimension in the height direction of the optical switch device is increased because the solenoid and the permanent magnet are stacked in this direction. Since the magnetic circuit is used in an unsealed, open flux state when a permanent magnet is disposed in such a manner, there is drawback in that a sufficient amount magnetic attraction force cannot be obtained for the considerable amount of occupied space, and the space is used less efficiently.

In view of such problems, an object of the present invention is to provide a configuration that reliably prevents positional offset of the movable member mounted with a light-reflecting member, and that allows the optical switch device be made thinner in an optical switch device of the type that moves the light-reflecting member and switches the coupled state between waveguides.

Means to Solve the Problems

In order to solve the above-described problems, according to the present invention, there is provided an optical switch device which has a movable member mounted with a light-reflecting member for reflecting light that is incident from a Z-direction, and emitting the light from a prescribed position offset in an X-direction; a fixed-side member for movably supporting the movable member in the X- and Y-directions; and drive means for driving the movable member in the X- and Y-directions, the X-, Y-, and Z-directions being perpendicular to each other, characterized in that it comprises a clamp mechanism provided with a pushing member for switching between a clamped state in which the movable member is pressed and fixed to the fixed-side member, and an unclamped state in which the movable member is released, and a clamping magnetic drive circuit for driving the pushing member, wherein the clamping magnetic drive circuit has a clamping coil disposed on a first member selected from the pushing member and the fixed-side member, and a clamping magnet disposed on the second member and caused to generate magnetic flux that interlinks with the clamping coil.

In the present invention, it is preferable that the clamping coil is wound so that it is formed with an opening facing the second member, the clamping magnet is provided with a pair of magnets that project from the second member to the first member, and the pair of magnets are disposed with different poles facing each other and are made to hold the clamping coil from the inside and outside of the opening. Such a configuration allows the optical switch device to be made thinner because the clamping coil and the clamping magnet are not required to be stacked in the height direction.

In the present invention, the clamp mechanism is provided with a back yoke positioned behind the pair of magnets inside and outside the opening of the clamping coil. Such a configuration allows magnetic flux from the clamping magnet to be used effectively and allows a considerable magnetic driving force to be obtained because the leaking magnetic flux from the clamping magnet can be kept low.

In the present invention, the clamp mechanism is provided with an urging member for urging the pushing member into the clamped or unclamped state, and the clamping magnetic drive circuit is able to move the pushing member against the urging force of the urging member. With this configuration, switching from one of the clamped and unclamped states of the pushing member to the other state thereof can be realized by the urging force of the urging member, whereby power consumption can be kept low.

Effects of the Invention

In the optical switch device of the present invention, the clamping coil and clamping magnet are not required to be stacked in the height direction of the device because a clamping magnetic drive circuit is used that is provided with a clamping coil and a clamping magnet that generates magnetic flux which interlinks with the clamping coil in order to drive the pushing member that switches the movable member between a clamped state and an unclamped state. A thinner optical switch device can therefore be ensured. Also, since a considerable magnetic driving force can be obtained, the pushing member can be reliably switched between clamping and unclamping.

BEST MODE FOR CARRYING OUT THE INVENTION

An optical switch device in which the present invention has been applied is described below with reference to the drawings.

(Basic Principles of the Optical Switch Device)

FIG. 1 is a diagram schematically depicting the basic principles of the optical switch device of the present invention. In the following description, the mutually perpendicular directions will be described as the X-, Y-, and Z-directions.

In FIG. 1, the optical switch device 1 is an 8-channel optical switch device in which a single input-side optical fiber 20 extending in the Z-direction and eight output-side optical fibers 21 are disposed in parallel along the X-direction, and light output from the input-side optical fiber 20 can be directed to the any of the eight output-side optical fibers 21. The optical fiber array 3 composed of the input-side optical fiber 20 and output-side optical fibers 21 is configured so that the optical fibers are arranged in the X-direction at equal intervals at a pitch of 250 μm.

In the optical switch device 1 of the present embodiment, a prism mirror 10 driven in the X-direction is used as the light-reflecting member whereby light that has entered from the Z-direction is reflected and emitted in the Z-direction from a prescribed position offset in the X-direction. The prism mirror 10 is a rectangular prism that has an inclined surface 101 that receives and emits light from the Z-direction, a first reflection surface 102 whereby light that has entered from the inclined surface 101 is reflected in the X-direction, a second reflection surface 103 which is perpendicular to the first reflection surface 102 with which light reflected from the first reflection surface 102 is reflected toward the inclined surface 101. The inclined surface 101 (aperture side) directly faces the optical fiber array 3. Also, the light emitted from the input-side optical fiber 20 is converted into collimated light by a collimating lens 22 prior to entering the prism mirror 10. Although not depicted in the diagrams, collimating lenses are also disposed between the eight output-side optical fibers 21 and the inclined surface 101 of the prism mirror 10, respectively.

In the optical switch device 1 configured in this manner, the prism mirror 10 is fixed in the position indicated by the solid line, for example. In this situation, light emitted from the input-side optical fiber 20 enters the prism mirror 10, follows the route of optical path L1 wherein the first reflection surface 102 and second reflection surface 103 inside the prism mirror 10 each reflect the light at 90° angles, and moves to an output-side optical fiber 21a located on the rightmost end of the output-side optical fibers 21.

When the output-side waveguide is switched from the output-side optical fiber 21a to the output-side optical fiber 21f positioned sixth from the right, the prism mirror 10 is driven in the X-direction and moved to the position indicated by the dotted line. When the prism mirror 10 is moved in this manner, the light reflection position on the first reflection surface 102 and second reflection surface 103 inside the prism mirror 10 moves, and the light emitted from the input-side optical fiber 20 follows the optical path L2 and proceeds to the output-side optical fiber 21f.

In this case, since the input-side optical fiber 20 and the output-side optical fibers 21 are aligned at a pitch of 250 μm in the optical fiber array 3, the prism mirror 10 is moved in the X-direction in increments of 125 μm, which corresponds to ½ the pitch of the input-side optical fiber 20 and the output-side optical fibers 21.

(Overall Configuration of the Optical Switch Device)

FIGS. 2(a), 2(b), 2(c), and 2(d) are a plan view, front view, side view, and rear view of the optical switch device according to the present invention. FIG. 3 is a cross-sectional view of the optical switch device along the A-A' line of FIG. 2(a). FIG. 4 is a perspective view of a optical switch main body mounted on the front half of the optical switch device of the present invention, viewed obliquely from the rear a state in which its pushing member is removed.

The optical switch device 1 has a flat substantially hexahedron shape, and the top side of the optical switch device 1 is covered with a pushing member 41 for urging a movable member 2 mounted with the prism mirror 10, as shown in FIGS. 2 and 3. An optical switch main body 100 in which the basic principles shown in FIG. 1 are employed is mounted on the front half of the optical switch device 1. A clamping magnetic drive circuit 45 constituting the clamp mechanism 40 as well as the pushing member 41 that covers the top side of the optical switch device 1 is mounted on the rear half of the optical switch device 1. Supports 47 and 48 that stand erect from a bottom plate 14 of a fixed-side member 13 are provided to both the left and right sides of the center position of the optical switch device 1, and pivoting support points 50 and 51 of the pushing member 41 are provided to the end portions of the supports 47 and 48.

(Configuration of the Optical Switch Main Body)

In the front half of the optical switch device 1, the optical switch main body 100 has the movable member 2 mounted with the prism mirror 10 shown by the dotted line, the fixed-side member 13 for movably supporting the movable member 2 with suspension wires 4 in the X- and Y-directions, and a magnetic drive circuit for driving the movable member 2 in the X- and Y-directions, as shown in FIGS. 2, 3, and 4.

The movable member 2 has a prism mirror mounting portion 11 mounted with the prism mirror 10, and a frame portion 16 mounted with a driving coil 5 for driving in the Y-direction and a pair of driving coils 6 for driving in the left and right X-directions. The prism mirror 10 is mounted in the center position in the X-direction of the prism mirror mounting portion 11, with the inclined surface 101 facing forward.

V-grooves 30 are formed continuously at a fixed pitch across the entire range of the X-direction on the lower surface 11a of the prism mirror mounting portion 11 (see FIG. 7). In the present embodiment, since the pitch of the optical fiber array 3 is 250 μm, the pitch of the V-grooves 30 is set to 125 μm in a corresponding manner. The area further in front of the prism mirror mounting portion 11 is the area in which the optical fiber array 3 described with reference to FIG. 1 is disposed, and the optical axes Lin and Lout show the optical axes of light emitted from the input-side optical fiber 20 of the optical fiber array 3, and light emitted to the output-side optical fibers 21 of the optical fiber array 3.

The fixed-side member 13 is composed of a bottom plate 14 that defines the lower surface of the optical switch device 1, a supporting base 12 attached to the bottom plate 14, and a fixing portion 15. Mounted on the bottom plate 14 are a driving manget 7 for driving in the Y-direction, a driving manget 8 for driving in the X-direction, and a yoke 9. The driving manget 7 is positioned inside the driving coil 5, and the driving manget 8 faces the driving coil 6. The fixing portion 15 for supporting the movable member 2 is disposed in the bottom plate 14 directly below the prism mirror mounting portion 11 of the movable member 2.

The fixing portion 15 has a longer dimension in the X-direction than the lower surface 11a of the prism mirror mounting portion 11. V-grooves 31 (concavo-convex) that mesh with the V-grooves 30 (concavo-convex) formed on the lower surface 11a of the movable member 2 are continuously formed on the upper surface 15a of the fixing portion 15. Therefore, the cross-sectional V-groove concave portion and cross-sectional V-groove convex portion are alternately formed on the fixed-side member 13. The pitch of the V-groove 31 is also 125 μm. In this case, the movement path of the movable member 2 in the X-direction, the lower surface 11a of the prism mirror mounting portion 11, and the upper surface 15a of the fixing portion 15 formed on the fixed-side member 13 are formed in a mutually parallel fashion.

Two suspension wires 4 each on the left and right extend parallel to the bottom plate 14 of the fixed-side member 13 from the supporting base 12 to sandwich the movable member 2 in a cantilever fashion from both sides in the left and right directions to provide support. A control circuit (not shown) for controlling the driving coils 5 and 6 mounted on the movable member 2 is disposed on the side of the supporting base 12, and the suspension wires 4 serve as power lines that energize the driving coils 5 and 6 mounted on the movable member 2.

The driving magnet 7 generates magnetic flux that interlinks with the driving coil 5 mounted on the movable member 2, forms a pair with the driving coil 5, and has a magnetic drive circuit that drives the movable member 2 in the Y-direction. Thrust is therefore applied to the movable member 2 in the Y-direction by energizing the driving coil 5. The driving magnet 8 generates magnetic flux that interlinks with the driving coil 6 mounted on the movable member 2, forms a pair with the driving coil 6, and has a magnetic drive circuit that drives the movable member 2 in the X-direction. Thrust is therefore applied to the movable member 2 in the X-direction by energizing the driving coil 6.

(Configuration of the Clamping Mechanism)

FIG. 5 is a perspective view of the optical switch device of the present invention, viewed obliquely from above with the clamping magnetic drive circuit mounted on the rear half thereof in a state in which the pushing member has been removed. FIG. 6 is a schematic diagram showing the magnetic flux generated by the clamping magnetic drive circuit.

In FIGS. 2, 3, and 5, the clamping mechanism 40 in the optical switch device 1 of the present embodiment is composed of a pushing member 41 in the form of a plate that urges and fixes the movable member 2 to the fixed-side member 13, a torsion spring 60 that constantly urges the movable member 2 toward the fixed-side member 13, and a clamping magnetic drive circuit 45 that drives the pushing member 41.

Pushing member 41 is composed of a top plate 42 that covers the upper portion of the optical switch main body 100 and extends to the rear of the optical switch device 1, and left and right side plates 43 that cover the side surfaces of the optical switch main body 100; and is pivotably supported by the pivoting support points 50 and 51 disposed at the end portion of the left and right supports 47 and 48 that stand erect from the bottom plate 14 of the fixed-side member 13. A pushing portion 44 in the form of a hemispheric projection that projects downward is formed in the front end portion of the top plate 42. The pushing member 41, together with the bottom plate 14 of the fixed-side member 13 that extends to the rear direction of the optical switch device 1, doubles as a casing for the optical switch device 1 and is provided with a function for shielding the optical switch main body 100 from the outside.

In the left and right supports 47 and 48 of the bottom plate 14, the torsion portion 61 of the torsion spring 60 is mounted in the center position in the height direction thereof, and the two end portions 62 and 63 that are widen upward and downward extend to the read of the optical switch device 1. Of the two end portions 62 and 63, the distal end of the end portion 62 is stopped at a position slightly to the rear side of the top plate 42 of the pushing member 41, and the distal end of the end portion 63 is stopped at the position slightly to the rear side of the bottom plate 14. Therefore, the torsion spring 60 pushes upward on the rear end portion of the pushing member 41, and, as a result, the pushing member 41 is inclined slightly forward to the bottom plate 14. In this state, the pushing projection 44 of the pushing member 41 makes contact with the upper surface 11b of the prism mirror mounting portion 11, and the pushing member 41 presses and fixes the prism mirror mounting portion 11 to the fixing portion 15 (clamped state).

The clamping magnetic drive circuit 45, as described below, is composed of first and second clamping magnets 70 and 71 mounted on the side of the pushing member 41, a clamping coil 72 mounted on the side of the bottom plate 14 of the 13, and a clamping yoke 75 (back yoke) mounted on the side of the bottom plate 14.

In the rearward area of the optical switch device 1, a rectangular opening 420 is formed in the top plate 42, openings 421 and 422 that are extended in the width direction (X-direction) are formed in positions near the further rear end portion of the top plate 42, and first and second plate-like clamping magnets 70 and 71 are mounted therein. In this case, the first and second clamping magnets 70 and 71 project in the direction of the fixed-side member 13 in a state in which the different poles thereof are opposed to each other.

In contrast, the center of the bottom plate 14 of the fixed-side member 13 is notched to a significant extent, and solely the right and left edge portions 14a and 14b extend rearward. In the present embodiment, the clamping coil 72 is mounted so as to straddle the right and left edge portions 14a and 14b. The clamping coil 72 is a square cylindrical coil in which the long side extends in the X-direction, and the coil opening 72e faces in the direction of the top plate 42 of the pushing member 41.

A yoke support member 76 is mounted on the bottom plate 14 so as to project inside the notch 73. The yoke support member 76 has a stepped portion 76a that is bent slightly downward in the Y-direction and then extends in the Z-direction, and the clamping yoke 75 is held by the distal end in the stepped portion 76a in a cantilevered fashion. Therefore, the lower end portion of the clamping yoke 75 is positioned inside the notch 73.

The clamping yoke 75 has a cross-sectional U-shape and is composed of two erect walls 75a and 75b that extend in parallel facing each other. Of the erect walls 75a and 75b, the erect wall 75a is situated outside of the coil opening 72e of the clamping coil 72, facing the coil side 72a with a prescribed gap therebetween; and the erect wall 75b is situated inside the coil opening 72e of the clamping coil 72, facing the coil sides 72a and 72b.

In the clamping magnetic drive circuit 45 configured in this manner with the optical switch device 1 in its assembled state, the first clamping magnet 70 is positioned outside the coil opening 72e of the clamping coil 72, between the erect wall 75a of the clamping yoke 75 and the coil side 72a of the clamping coil 72. The second clamping magnet 71 is positioned inside the coil opening 72e of the clamping coil 72, between the erect wall 75b of the clamping yoke 75 and the coil side 72a of the clamping coil 72.

Therefore, the first and second clamping magnets 70 and 71 (magnet pair) are disposed so as to sandwich the clamping coil 72 on the inside and outside of the coil opening 72e with the different poles thereof opposed to each other; and the erect walls 75a and 75b of the clamping yoke 75 are disposed as a back yoke behind the clamping magnets 70 and 71 inside and outside the coil opening 72e of the clamping coil 72.

In the clamp mechanism 40 configured in such a manner, the clamping magnets 70 and 71 and the clamping yoke 75 in the clamping magnetic drive circuit 45, as shown in FIG. 6, generate magnetic flux that interlinks with the coil side 72a of the clamping coil 72, as indicated by the arrow Q, and the magnetic field is blocked. Therefore, in the clamp mechanism 40, the rear end portion of the pushing member 41 is pushed upward by a torsion spring 76, as indicated by the arrow F1, in a state in which the clamping coil 72 is not energized. As a result, the front end portion of the pushing member 41 presses the movable member 2 downward (clamped state). When the clamping coil 72 is energized, the clamping magnetic drive circuit 45 causes the rear end portion of the pushing member 41 to press downward against the yoke support member 76, as indicated by the arrow F2. As a result, the front end portion of the pushing member 41 lifts and releases the action of pressing and fixing the movable member 2 in the downward direction (unclamped state).

(Description of the Optical Waveguide Switching Operation)

FIG. 7 is a schematic diagram showing the positional relationships and other aspects of the movable member and fixed-side member when the optical waveguide switching operations are carrying out by the optical switch device.

In the initial fixed position, the movable member 2 is urged by the pushing member 41 toward the fixed-side member 13, and is in a fixed clamped state, as shown in FIG. 7(a). The V-grooves 30 and 31 formed on the lower surface 11a of the prism mirror mounting portion 11 and the upper surface 15a of the fixing portion 15 are engaged.

The clamping coil 72 is first energized to switch the optical waveguide from this state, and the movable member 2 is simultaneously lifted in the Y-direction. As a result, the pushing member 41 resists the urging force of the torsion spring 60, as shown in FIG. 7(b), and pivots about the center of the pivoting support points 50 and 51 so that the front end portion is lifted and the pushing projection 44 positioned at the distal end of the pushing member 41 is lifted from the movable member 2.

The driving coil 6 is subsequently energized, and the movable member 2 is moved in the X-direction, as shown in FIG. 7(c). When the movable member 2 has then moved to the desired position in the X-direction, the power fed to the driving coil 5 is stopped, and the movable member 2 is allowed to settle down in the Y-direction by the elastic return force of the suspension wires 4, as shown in FIG. 7(d).

Next, the power fed to the clamping coil 72 is stopped. As a result, the pushing member 41 urges the movable member 2 down in the Y-direction by using the urging force of the torsion spring 60, and presses and fixes the movable member to the fixed-side member 13 to form a clamped state, as shown in FIG. 7(d). The V-grooves 30 formed in the movable member 2 and the V-grooves 31 formed in the fixed-side member 13 mesh together at this time, and the movable member 2 is positioned in the X-direction, as shown in FIG. 7(e).

Power fed to the driving coil 6 is thereafter stopped, and optical waveguide switching is thereby completed. Therefore, the light that has entered the prism mirror 10 from the input-side optical fiber 20 is emitted to a prescribed output-side optical fiber 21 via the prism mirror 10.

(Effects of the Present Embodiment)

The optical switch device 1 of the present embodiment uses the clamping magnetic drive circuit 45 composed of the clamping coil 72 and clamping magnets 70 and 71 in order to drive the pushing member 41 that urges and fixes the movable member 2 mounted with the prism mirror 10. Since the clamping magnetic drive circuit 45 can provide a considerable magnetic driving force in comparison with a clamping mechanism in which a solenoid is used, the movable member can be reliably switched between clamped and unclamped states.

In the present embodiment, the clamping coil 72 constituting the clamping magnetic drive circuit 45 is wound so that the opening faces the pushing member 41. The clamping magnets 70 and 71 project from the pushing member 41 toward the bottom plate 14, and are disposed so as to sandwich the clamping coil 72 on the inside and outside of the coil opening 72e. For this reason, there is no requirement that the clamping coil 72 and clamping magnets 70 and 71 be stacked in the height direction of the device, hence the optical switch device 1 can be made thinner in a reliable manner.

Furthermore, since the clamp mechanism 40 of the present embodiment is provided with a clamping yoke 75 positioned behind the clamping magnets 70 and 71 inside and outside the opening of the clamping coil 72, the leaking magnetic flux from the clamping magnets 70 and 71 can be kept low. The magnetic flux of the clamping magnets 70 and 71 can be effectively used and a considerably magnetic driving force can be obtained.

In the clamp mechanism 40, the pushing member 41 can be brought into a clamped state by the urging force of the torsion spring 60, and the clamping magnetic drive circuit 45 switches the pushing member 41 to the unclamped state whereby the pushing member pushes against the urging force of the torsion spring 60. Therefore, since power may be provided solely during the period in which the movable member 2 is moved, power consumption can be kept low.

In the present embodiment, the pushing member 41 doubles as a casing that covers the top and sides of the optical switch main body 100. Therefore, a separate casing for covering the optical switch device 1 is not required. For this reason, disposing the pushing member 41 upward in the Y-direction of the movable member 2 does not prevent the optical switch device 1 from being made thinner.

Furthermore, in the present embodiment, the bottom wall 75c of the clamping yoke 75 that constitutes the clamping magnetic drive circuit 45 is housed in the notch 73 formed in the bottom plate 14 of the fixed-side member 13. For this reason, even if the clamping yoke 75 has a bottom wall 75c, the bottom plate 14 of the fixed-side member 13 and the bottom wall 75c of the clamping yoke 75 are not stacked in the Y-direction and the optical switch device 1 is not prevented from being made thinner.

(Other Embodiments)

In the above-described embodiment, two clamping magnets were used in the clamping magnetic drive circuit 45, but three or four clamping magnets may also be used, as shown in FIGS. 8(a) to 8(d).

In the embodiment shown in FIG. 8(a), the long sides 72a and 72b of the clamping coil 72 are in a configuration in which four clamping magnets 80, 81, 82, and 83 are disposed so as to sandwich the clamping coil 72 on the inside and outside of the coil opening 72e, the clamping magnets 80 and 81 are set with the different poles thereof opposed to each other, and the clamping magnets 82 and 83 are also set with the different poles thereof opposed to each other.

In the embodiment shown in FIG. 8(b) as well, the long sides 72a and 72b of the clamping coil 72 are in a configuration in which three clamping magnets 80, 83, and 84 are disposed so as to sandwich the clamping coil 72 on the inside and outside of the coil opening 72e, the clamping magnets 80 and 84 are set with the different poles thereof opposed to each other, and the clamping magnets 84 and 83 are also set with the different poles thereof opposed to each other.

In this configuration as well, a back yoke is preferably disposed with the aid of the clamping yokes 91, 92, and 93 behind the clamping magnets 80 to 84, as shown in FIGS. 8(c) and 8(d).

In any of the above-described embodiments, the clamp mechanism 40 is provided with a torsion spring 60 for urging the pushing member 41 into a clamping state, and the clamping magnetic drive circuit 45 is configured to drive the pushing member 41 against the urging force of the torsion spring 60. Another possible configuration is one in which the torsion spring 60 urges the pushing member 41 into an unclamping state, and the clamping magnetic drive circuit 45 moves the pushing member 41 from an unclamping state to a clamping state against the urging force of the torsion spring 60.

Yet another possible configuration of the clamp mechanism 40 is one in which a torsion spring 60 is not used, and the clamping magnetic drive circuit 45 switches the pushing member 41 between the clamped and unclamped states.

INDUSTRIAL APPLICABILITY

In the optical switch device of the present invention, a clamping magnetic drive circuit is used having a clamping coil and a clamping magnet that generates magnetic flux which interlinks with the clamping coil in order to drive the pushing member that switches the clamped or unclamped state of the movable member mounted with a light-reflecting member. For this reason, the clamping coil and clamping magnet are not required to be stacked in the height direction of the device. A thinner optical switch device can therefore be ensured. Also, since a considerable magnetic driving force can be obtained in comparison with the clamp mechanism in which a solenoid is used, the clamp on the movable member can be reliably switched between clamping and unclamping.

BRIEF DESCRIPTION OF THE DRAWINGS

FIG. 1 is a diagram schematically depicting the basic principles of an optical waveguide switching device in which the present invention has been applied.

FIGS. 2(a), 2(b), 2(c), and 2(d) are a plan view, front view, side view, and rear view of an optical switch device in which the present invention has been applied.

FIG. 3 is a cross-sectional view of the optical switch device along the A-A' line of FIG. 2(a).

FIG. 4 is a perspective view of an optical switch device in which the present invention has been applied, viewed obliquely from the rear with the optical switch device mounted on the front half thereof in a state in which the pushing member has been removed.

FIG. 5 is a perspective view of an optical switch device in which the present invention has been applied, viewed obliquely from above with the clamping magnetic drive circuit mounted on the back half thereof in a state in which the pushing member has been removed.

FIG. 6 is a schematic diagram of an optical switch device in which the present invention has been applied, showing the orientation of the magnetic flux generated by the clamping magnetic drive circuit.

FIG. 7 is a schematic diagram of an optical switch device in which the present invention has been applied, showing the positional relationships and other aspects of the movable member and fixed-side member when the optical waveguide operations are carrying out.

FIG. 8 is a schematic diagram showing another configuration of the clamping magnetic drive circuit used in an optical switch device in which the present invention has been applied.

| Symbols | |
| --- | --- |
| 1: | Optical switch device |
| 2: | Movable member |
| 3: | Optical fiber array |
| 4: | Suspension wires |

-continued

| Symbols | |
|---|---|
| 5, 6: | Driving coils |
| 7, 8: | Driving magnets |
| 10: | Prism mirror |
| 12: | Supporting base |
| 13: | fixed-side member |
| 15: | Fixing portion |
| 20: | Input-side optical fiber |
| 21: | Output-side optical fibers |
| 30, 31: | V-grooves |
| 40: | Clamping mechanism |
| 41: | Pushing member |
| 44: | Pushing projection |
| 45: | Clamping magnetic drive circuit |
| 50, 51: | Pivoting points |
| 60: | Torsion spring (urging member) |
| 70, 71, 80, 81, 82, 83, 84: | Clamping magnets |
| 72: | Clamping coil |
| 72a, 72b: | Coil sides |
| 72e: | Clamping coil opening |
| 75: | Clamping yoke (back yoke) |
| 100: | Optical switch main body |

The invention claimed is:

1. An optical switch device which has a movable member mounted with a light-reflecting member for reflecting light that is incident from a Z-direction, and emitting the light in the Z-direction from a prescribed position offset in an X-direction; a fixed-side member for movably supporting the movable member in the X-direction and a Y-direction; and drive means for driving the movable member in the X-direction and the Y-direction, the X-direction, Y-direction, and Z-direction being perpendicular to each other, comprising:

a clamp mechanism provided with a pushing member for switching between a clamped state in which the movable member is pressed along the Y direction and fixed to the fixed-side member, and an unclamped state in which the pressing of the movable member along the Y direction is released; and a clamping magnetic drive circuit for driving the pushing member, said clamping magnetic drive circuit having a clamping coil disposed on a first member selected from one of the pushing member and the fixed-side member, and a clamping magnet disposed on a second member comprising the other of the pushing member and the fixed-side member for generating magnetic flux that interlinks with the clamping coil, wherein the clamping coil is wound so that it is formed with an opening facing the second member and the clamping magnet is provided with a pair of magnets that project from the second member to the first member, and wherein said pair of magnets is disposed with different poles facing each other and are made to hold the clamping coil from the inside and outside of said opening.

2. The optical switch device according to claim 1 wherein the clamp mechanism further comprises a back yoke positioned behind said pair of magnets inside and outside said opening of the clamping coil.

3. The optical switch device according to claim 1 wherein the clamp mechanism further comprises an urging member for urging said pushing member into said clamped state or said unclamped state, and wherein said clamping magnetic drive circuit is able to move the pushing member against an urging force of the urging member.

4. An optical switch device with a movable member mounted with a light-reflecting member for reflecting light that is incident from a Z-direction, and emitting the light in the Z-direction from a prescribed position offset in an X-direction, a fixed-side member for movably supporting the movable member in the X-direction and a Y-direction and drive means for driving the movable member in the X-direction and Y-direction, the X-direction, Y-direction and Z-direction being perpendicular to each other, comprising:

a clamp mechanism provided with a pushing member for switching between a clamped state in which the movable member is pressed and fixed to the fixed-side member, and an unclamped state in which the movable member is released; and a clamping magnetic drive circuit for driving the pushing member, wherein the clamping magnetic drive circuit has a clamping coil, disposed on a first member comprising one of the pushing member and the fixed-side member, and a clamping magnet for generating magnetic flux that interlinks with the clamping coil, disposed on a second member comprising the other of the pushing member and the fixed-side member, the pushing member is supported on the fixed-side member in a manner that it can swing along the Y-direction, the movable member is disposed between the pushing member and the fixed-side member along the Y-direction on one side of a swing center of the pushing member, and the clamping magnetic drive circuit is disposed between the pushing member and the fixed-side member on the other side of the swing center thereof, and the clamping magnet and the clamping coil are disposed so as not to stack along the Y direction.

5. The optical switch device according to claim 4, wherein said clamping coil is wound so that it is formed with an opening facing said second member, the clamping magnet is provided with a pair of magnets that project from said second member to said first member, and said pair of magnets is disposed with different poles facing each other and are made to hold the clamping coil from the inside and outside of said opening.

6. The optical switch device according to claim 5, wherein the clamp mechanism further comprises a back yoke positioned behind said pair of magnets inside and outside said opening of the clamping coil.

7. The optical switch device according to claim 5, wherein said clamp mechanism further comprises an urging member for urging said pushing member into said clamped state or said unclamped state, and wherein said clamping magnetic drive circuit is able to move the pushing member against an urging force of the urging member.

* * * * *